UNITED STATES PATENT OFFICE.

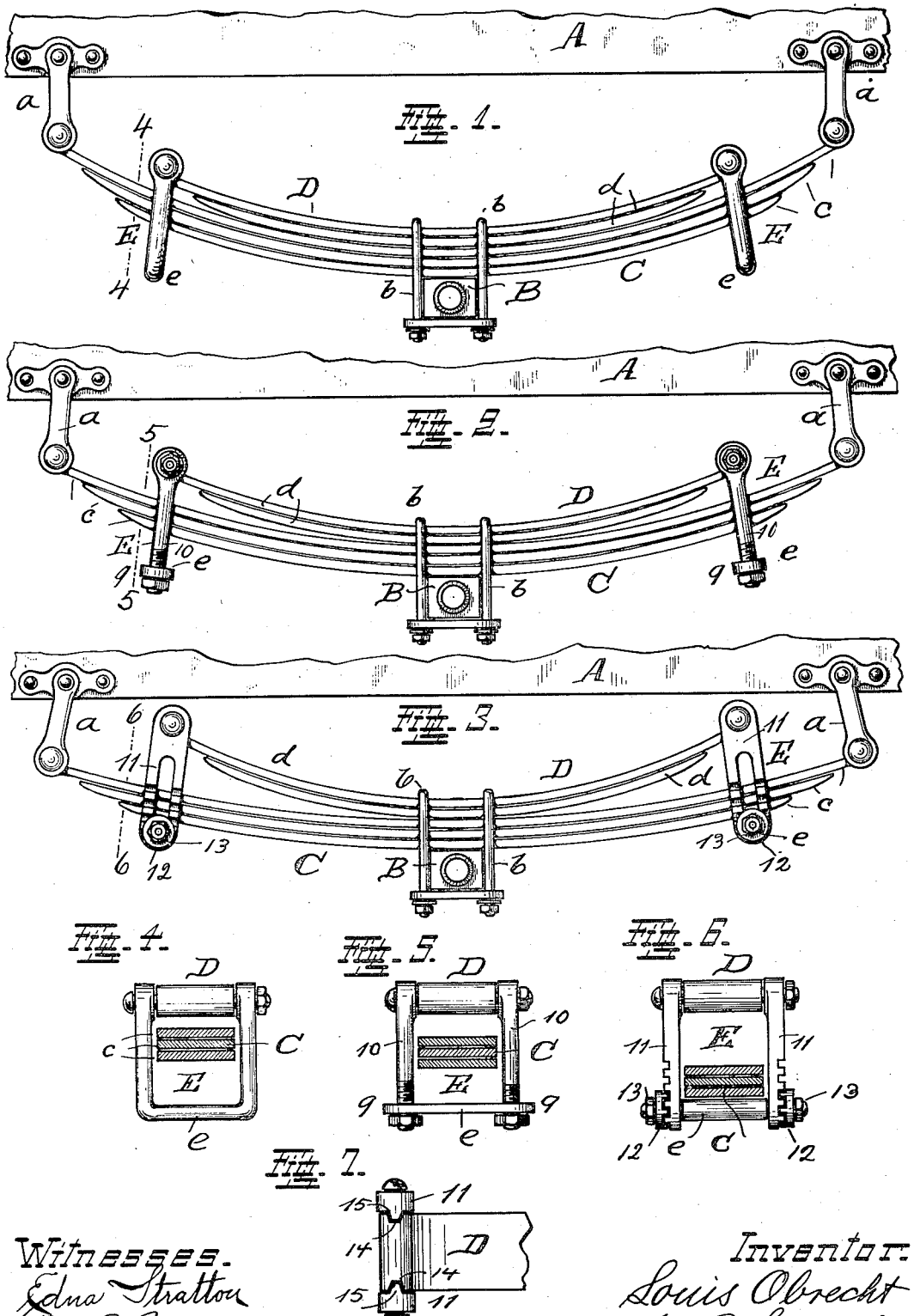

LOUIS OBRECHT, OF CONNERSVILLE, INDIANA.

VEHICLE-SPRING.

1,199,019. Specification of Letters Patent. Patented Sept. 19, 1916.

Application filed June 24, 1912, Serial No. 705,446. Renewed July 18, 1916. Serial No. 110,004.

*To all whom it may concern:*

Be it known that I, LOUIS OBRECHT, a citizen of the United States, and a resident of Connersville, Fayette county, State of Indiana, have invented certain new and useful Improvements in Vehicle-Springs; and I do declare the following to be a clear, full, and exact description of the invention, attention being called to the drawing which accompanies this application and forms a part thereof.

This invention concerns springs used for supporting vehicle-bodies upon the vehicle axles. The springs used for this purpose are generally designed as to strength to support maximum loads, while the circumstance that the same springs are not in proper relation to a reduced load is not considered. The objection arising from this condition is that riding in a passenger-carrying vehicle, unless the full complement of the possible load is carried, is not as comfortable as it could be, because the particular strength of the spring is out of proportion and excessive with respect to a limited load and resists the depression necessary to produce proper cushioning effect.

The object of my invention is to provide improvements in connection with such springs, whereby their cushioning capacity is caused to become adjusted automatically to the weight of the load so as to be practically the same under general conditions.

In the following specification and particularly pointed out in the claims at the end thereof, will be found a full description of my invention, together with its operation, parts and construction, which latter is also illustrated in the accompanying drawing, in which:—

Figures 1, 2 and 3, show my improved spring in side views and under various conditions, it being shown under normal condition, that is not loaded, in Fig. 1, while Fig. 3 shows it carrying a capacity-load. Figs. 4, 5 and 6, are cross-sections on line 4—4, 5—5, and 6—6 respectively of Figs. 1, 2 and 3. Fig. 7, is a top-view of one of the end-portions of one of the springs.

In the drawing, A indicates the load which may be represented by the body of a suitable vehicle as an automobile for instance.

B is one of the axles which carry this load, supports by means of springs being interposed to cushion the load. Springs of various types are in use for this purpose, generally designed as to strength to furnish a support for the full load of the intended capacity. In the case of my improved spring-support, I use two springs at each point of support instead of one, the combined strength of said two springs, when serving simultaneously, being sufficient to correspond to a load substantially equal to the capacity load. In cases when the load is below capacity, one spring only is in action and the other is load-free. The spring which carries load at all times is shown at C in the drawing and consists of one or more leaves c, assembled and connected in a manner customary in the manufacture of vehicles. At its ends it is connected to the body by suitable links or shackles a. Above this spring, there is the other spring D, which is shorter than the spring first mentioned and consists likewise of one or more leaves d. Both springs are supported upon the axle to which they are connected in any suitable way as for instance by customary clips b. The leaves of both springs are arranged substantially alike, that is curved in the same direction and with the longest leaf of each spring uppermost, so that as to action and resistance both springs act alike and always in the same direction.

Fig. 1, shows the spring-support under normal conditions, that is the weight of the unloaded vehicle body is carried exclusively by spring C. Observe also Fig. 4. Fig. 2, shows how this spring is effected by a limited load, carried by the vehicle body. Observe also Fig. 5. Fig. 3, shows conditions when a capacity load is carried, in which case spring D, enters into action to assist spring C, after which both springs serve to support the load. Observe also Fig. 6. This effect is obtained by means of stirrups E, connected to one of the springs and adapted to enter into engagement with the other spring after the spring first used has been deflected by the load to a certain degree.

By preference the connection of the stirrups is made to the upper spring as shown.

As will be seen the heavy load supposed to be carried in Fig. 3, is supported by both springs C and D, or as it might also be stated, fitting this particular case, by a five-leaved spring because all leaves of both springs are engaged and serve with a similar load-resisting action in the same (upward) direction. It will now be understood, for reasons before explained, that if these five leaves were combined in a single spring such a spring, while appropriate for a capacity load, would be objectionable and undesirable in case a limited load only is carried for which, proportionately considered, the strength of this spring would be excessive and would therefore not provide the necessary cushion. By my improvements however the cushioning capacity of the spring-support is graduated proportionately to the load as will now be readily understood and furthermore this capacity adjusts itself entirely automatically by the make and break connection of the stirrups as it is controlled by the load. Thus in case of a limited load, considering an automobile for instance, the occupants would have the benefit of a properly cushioned spring instead of being jolted by a spring too stiff for the particular condition, the effect being obtained without the aid of shock absorbers. On the other hand, in case of a heavy load, the strength of the spring-support could not be overtaxed because the auxiliary spring enters into action and augments the capacity of the first spring so that instead of one spring serving to carry the load two springs do the work.

The stirrups might be simply U-shaped links as shown in Figs. 1 and 4. The distance between supporting bar *e* of the stirrups and the underside of spring C determines the moment when the two springs become operatively connected for simultaneous action. By making this distance adjustable the extent to which the springs coact for simultaneously supporting the load may be conveniently determined and controlled. It permits also readjustment at any time in case spring C should become weak in which case by shortening the stirrups, the support of the auxiliary spring D may be obtained at the proper time. This may be done as shown in Figs. 2 and 5 and where member *e* is held by a screw-connection 9, to two side-pieces or links 10—10. Another form of adjustment is shown in Figs. 3 and 6, where two links 11—11 are used which are slotted to receive the ends of spring-supporting member *e*. Notched washers 12 receive and support these ends and are adjustably seated in complementary notches in the outer side of these links. Nuts 13 complete the connection.

The connection of stirrups E to the spring on which they are carried should be rigid in order to prevent rattling and wear. A convenient way of doing this is shown in Fig. 7, where the curled ends of the spring which carry the stirrups are formed with notches 14, which receive lugs 15 on the side-members of the stirrups. These side-members may be those of either of the forms shown.

Having described my invention, I claim as new:

1. In spring-support for vehicles, the combination of two superposed springs adapted to be supported upon an axle, each spring consisting of a number of leaves graduated in length and all leaves arranged substantially alike, that is bowed in the same direction, and positioned so that the shortest leaf of one spring is in contact with the longest leaf of the other spring, means at the free ends of one spring whereby it is permanently load-connected, and means at the ends of the other spring adapted to be engaged by the first spring, only when the same is deflected under load, after which both springs co-act in the same direction to carry the load.

2. In spring-support for vehicles, the combination of two superposed springs adapted to be supported upon an axle, each spring consisting of a number of leaves graduated in length and all leaves arranged substantially alike, that is bowed in the same direction, and positioned so that the shortest leaf of one spring is in contact with the longest leaf of the other spring, stirrups at the free ends of one spring adapted to be engaged by the other spring when the same is partly deflected under load and means at the ends of this latter spring whereby the same is permanently load connected.

3. In spring-support for vehicles, the combination of a spring consisting of a number of leaves of graduated length and bowed in the same direction and adapted to be connected to an axle, means at the ends of this spring whereby it is permanently connected to support the load, an additional spring supported above the spring first mentioned and consisting of leaves bowed in the same direction as the leaves of said spring, and stirrups carried at the free ends of this additional spring and adapted to be engaged by the first spring when deflected under load and to co-act with the same thereafter.

4. In spring-support for vehicles, the combination of a spring consisting of a number of leaves of graduated length all bowed in the same direction and adapted to be connected to an axle, means at the ends of this spring whereby it is permanently connected to support the load, an additional spring supported above the spring first mentioned and consisting of leaves bowed in the same direction as the leaves of said spring, two links carried at each of the free ends of this additional spring and depending below the other spring and bars transversely arranged below this latter spring and adjustably supported by the links mentioned, said bars being adapted to be engaged by said spring above it when deflected under load.

5. In spring-support for vehicles, the combination of two superposed springs adapted to be supported upon an axle, each spring consisting of a number of leaves graduated in length and all leaves arranged substantially alike, that is bowed in the same direction, and positioned so that the shortest leaf of one spring is in contact with the longest leaf of the other spring, two links rigidly connected to each of the free ends of one spring and extending beyond the other spring on each side thereof, bars connected to said links and transversely arranged with reference to the spring last mentioned and adapted to be engaged thereby when the same is deflected and means at the ends of this spring whereby the same is permanently load-connected.

In testimony whereof, I hereunto affix my signature in the presence of two witnesses.

LOUIS OBRECHT.

Witnesses:
  C. SPENGEL,
  T. LE BEAU.